US010424190B2

(12) United States Patent
Zribi et al.

(10) Patent No.: US 10,424,190 B2
(45) Date of Patent: Sep. 24, 2019

(54) SAFETY AUTOMATION SYSTEM AND METHOD OF OPERATION

(71) Applicant: CARRIER CORPORATION, Jupiter, FL (US)

(72) Inventors: Anis Zribi, Colorado Springs, CO (US); Travis Silver, Colorado Springs, CO (US); Jonathon Hughes, Durham, NC (US); John Andres, Chapel Hill, NC (US); Chris Rovenstine, Chapel Hill, NC (US); Sean Curley, Greensboro, NC (US); Michael L. Richards, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/743,908

(22) PCT Filed: Jul. 13, 2016

(86) PCT No.: PCT/US2016/041991
§ 371 (c)(1),
(2) Date: Jan. 11, 2018

(87) PCT Pub. No.: WO2017/011497
PCT Pub. Date: Jan. 19, 2017

(65) Prior Publication Data

US 2018/0197402 A1 Jul. 12, 2018

Related U.S. Application Data

(60) Provisional application No. 62/191,805, filed on Jul. 13, 2015.

(51) Int. Cl.
*G08B 25/14* (2006.01)
*G08B 6/00* (2006.01)
(Continued)

(52) U.S. Cl.
CPC ............... *G08B 25/14* (2013.01); *G08B 6/00* (2013.01); *G08B 7/06* (2013.01); *G08B 25/01* (2013.01); *G08B 25/009* (2013.01)

(58) Field of Classification Search
CPC .......... G08B 25/01; G08B 25/14; G08B 6/00; G08B 7/06
(Continued)

(56) References Cited

U.S. PATENT DOCUMENTS 4,531,114 A 7/1985 Topol et al.
5,781,108 A 7/1998 Jacob et al.
(Continued)

FOREIGN PATENT DOCUMENTS

WO 2014072910 A1 5/2014

OTHER PUBLICATIONS

Honeywell Building Solutions, "Fire & Life Safety", retreived from the Internet on Jan. 10, 2018; 2 pages. URL: <https://buildingsolutions.honeywell.com/en-US/solutions/firelifesaftey/Pages/default.aspx>.
(Continued)

*Primary Examiner* — Omar Casillashernandez
(74) *Attorney, Agent, or Firm* — Cantor Colburn LLP

(57) ABSTRACT

A safety automation system (20) for an occupiable structure and method of operation includes a plurality of detection devices (30) to facilitate the detection of a hazard condition and output a hazard detected signal to a computing management system (44) that may be a cloud computing system. The management system includes a computer processor (46), and a computer readable storage medium (48) capable of generating various notifications to a mobile user interface device (32).

1 Claim, 4 Drawing Sheets

(51) Int. Cl.
*G08B 7/06* (2006.01)
*G08B 25/01* (2006.01)
*G08B 25/00* (2006.01)

(58) Field of Classification Search
USPC .......................................................... 340/500
See application file for complete search history.

(56) References Cited

U.S. PATENT DOCUMENTS

| | | | | |
|---|---|---|---|---|
| 6,121,885 | A | 9/2000 | Masone et al. | |
| 6,420,973 | B2 | 7/2002 | Acevedo | |
| 6,756,896 | B2 | 6/2004 | Ford | |
| 6,859,145 | B2 | 2/2005 | Wilker et al. | |
| 6,873,256 | B2 | 3/2005 | Lemelson et al. | |
| 7,005,994 | B2 | 2/2006 | King | |
| 7,019,646 | B1 | 3/2006 | Woodard et al. | |
| 7,148,797 | B2 | 12/2006 | Albert | |
| 7,161,481 | B2 | 1/2007 | Turner | |
| 7,230,528 | B2 | 6/2007 | Kates | |
| 7,528,711 | B2 | 5/2009 | Kates | |
| 7,924,149 | B2 | 4/2011 | Mendelson | |
| 7,994,928 | B2 | 8/2011 | Richmond | |
| 8,378,808 | B1 * | 2/2013 | Gwaltney | G08B 29/183 340/286.05 |
| 8,981,927 | B2 | 3/2015 | McSheffrey | |
| 10,042,341 | B1 * | 8/2018 | Jacob | G06N 5/04 |
| 2002/0149491 | A1 | 10/2002 | Crandall, Jr. et al. | |
| 2003/0076341 | A1 * | 4/2003 | Kuki | G06F 3/04817 715/700 |
| 2005/0253706 | A1 * | 11/2005 | Spoltore | G08B 25/008 340/539.14 |
| 2006/0226973 | A1 * | 10/2006 | Catlin | G08B 17/10 340/539.11 |
| 2008/0266079 | A1 * | 10/2008 | Lontka | G08B 7/06 340/539.13 |
| 2009/0303031 | A1 * | 12/2009 | Strohallen | G08B 25/10 340/501 |
| 2010/0259378 | A1 * | 10/2010 | Moore | G08B 21/10 340/539.28 |
| 2010/0277300 | A1 * | 11/2010 | Cohn | G08B 29/02 340/506 |
| 2015/0082225 | A1 | 3/2015 | Shearer | |
| 2015/0100167 | A1 | 4/2015 | Sloo et al. | |
| 2017/0187993 | A1 * | 6/2017 | Martch | B64C 39/024 |

OTHER PUBLICATIONS

International Search Report for application No. PCT/US2016/041991 dated Oct. 4, 2016; 7 pages.

Nacelewicz, Tess. "Wireless touted at NFPA show", Security Systems News, dated Jun. 16, 2014, retreived from the Internet; 2 pages, URL: <http://www.securitysystemsnews.com/article/wireless-touted-nfpa-show>.

Written Opinion of the International Searching Authority for application No. PCT/US2016/041991 dated Oct. 4, 2016; 8 pages.

* cited by examiner

SAFETY AUTOMATION SYSTEM AND METHOD OF OPERATION

CROSS-REFERENCES TO RELATED APPLICATIONS

This patent application is a National Stage Application of PCT/US2016/041991, filed Jul. 13, 2016, which claims the priority of U.S. Provisional Application No. 62/191,805, filed Jul. 13, 2015, each of which are incorporated herein by reference in their entirety.

BACKGROUND

The present disclosure relates to a safety automation system and, more particularly, to a system having a mobile user interface device and method of operation.

The expansion of home automation and associated technologies is known to enhance the life and safety of occupants by leveraging fire safety devices in conjunction with various alert devices, thus adding value to connected ecosystems in homes and other occupiable structures. Further development of home automation as it relates to any hazard condition and the protection of occupants and other individuals is desirable.

SUMMARY

A safety automation system for an occupiable structure according to one, non-limiting, embodiment of the present disclosure includes a computing management system including a computer processor, and a computer readable storage medium; and a detection device adapted to detect a hazard condition and output an associated signal to the computing management system, and wherein the computing management system is configured to send a hazard notification signal to a user interface device remotely located from the occupiable structure.

Additionally to the foregoing embodiment, the user interface device is mobile and the computing management system includes a wireless communications circuitry capable of receiving and transmitting wireless signals to the user interface device.

In the alternative or additionally thereto, in the foregoing embodiment, the wireless signals include a current local weather report received by and transmitted from the computing management system to the user interface device.

In the alternative or additionally thereto, in the foregoing embodiment, the wireless signals include a map of the occupiable structure and an expected occupant location from the computer readable storage medium.

In the alternative or additionally thereto, in the foregoing embodiment, the wireless signals include a map of the occupiable structure from the computer readable storage medium and a location of the hazard condition processed by the computer processor.

In the alternative or additionally thereto, in the foregoing embodiment, the computing management system at least partially comprises a cloud computing system.

In the alternative or additionally thereto, in the foregoing embodiment, the automation system includes an ancillary alert device controlled by the processor for alerting an occupant of the hazard condition.

In the alternative or additionally thereto, in the foregoing embodiment, the ancillary alert device provides at least one of a tactile, visual, and audible alert.

In the alternative or additionally thereto, in the foregoing embodiment, the hazard condition is not an intrusion and the ancillary alert device is a security alert device.

In the alternative or additionally thereto, in the foregoing embodiment, the automation system includes a dedicated alert device configured to receive a signal generated by the detection device for alerting the occupant of the hazard condition.

In the alternative or additionally thereto, in the foregoing embodiment, the wireless communication circuitry includes a cellular telephone transceiver circuit and the user interface device is a cellular telephone in communication with the cellular telephone transceiver circuit.

In the alternative or additionally thereto, in the foregoing embodiment, the wireless communication circuitry includes a local area network transceiver circuit.

In the alternative or additionally thereto, in the foregoing embodiment, the user interface device includes an interactive screen configured to display images associated with the notification signals.

In the alternative or additionally thereto, in the foregoing embodiment, the notification signal is indicative of system maintenance status.

In the alternative or additionally thereto, in the foregoing embodiment, the notification signal is indicative of hazard location.

In the alternative or additionally thereto, in the foregoing embodiment, the automation system includes a satellite navigation transmitter device in wireless communication with a satellite navigation receiver of the wireless communication circuitry, wherein the satellite navigation transmitter device outputs a navigation signal to the computing management system indicative of a location of the mobile user interface device.

In the alternative or additionally thereto, in the foregoing embodiment, the computing management system is configured to send a notification signal to the mobile user interface device when the safety automation system is in need of maintenance and when the mobile user interface device is near a store that supplies at least one of maintenance parts and services.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
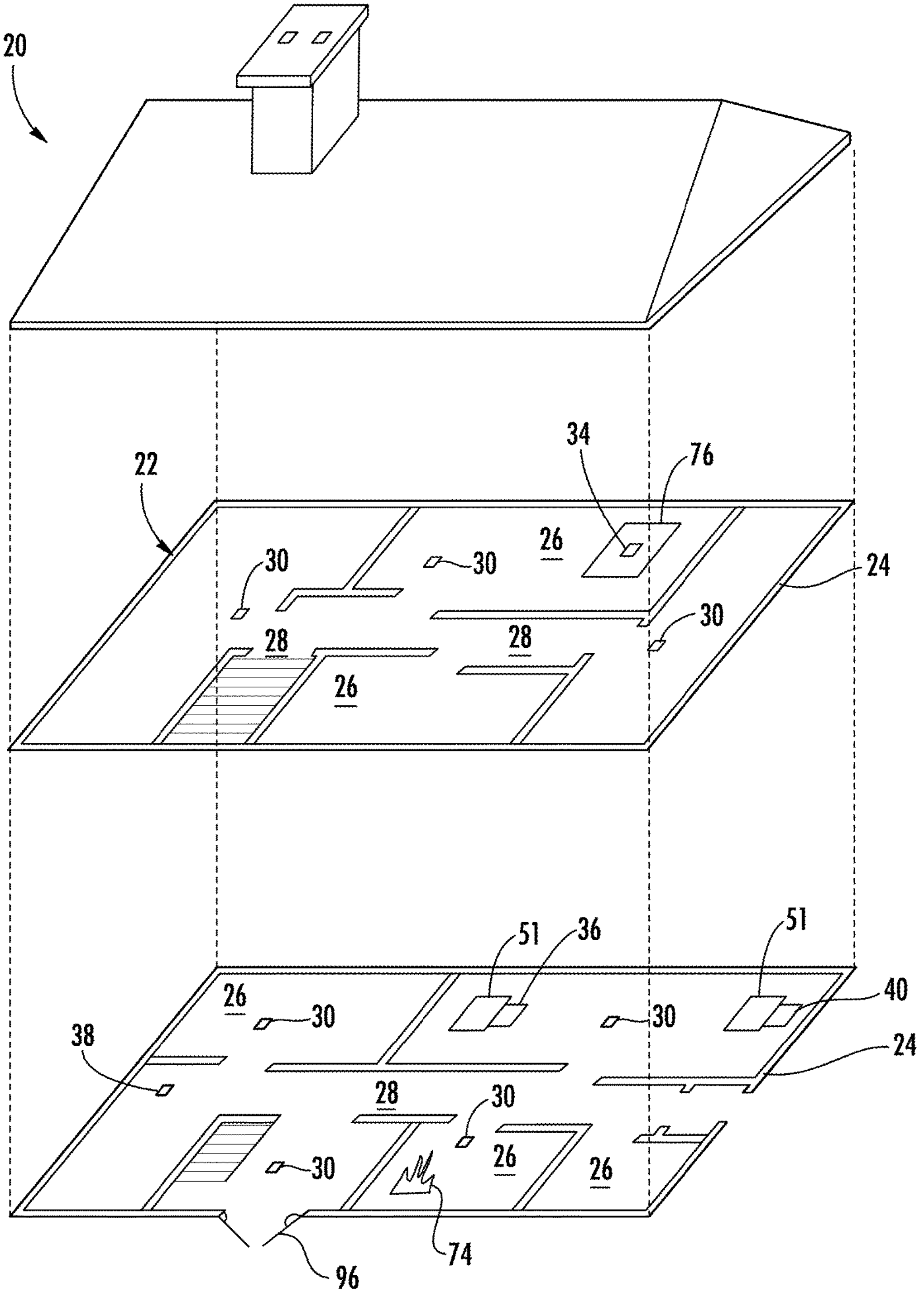
FIG. 1 is an exploded perspective view of an occupiable structure illustrated as an application for a safety automation system.

Referring to FIG. 1, an exemplary embodiment of a safety automation system 20 is illustrated and may be applied to occupiable structures 22 such as, for example, residential homes, apartment buildings, commercial buildings, ships, service centers such as hospitals and hotels, and other structures. The occupiable structure 22 may have any number of floors 24 each having any number of rooms 26. The floors 24 and rooms 26 may be interconnected by a plurality of routes 28 (i.e., entry and egress) that may include hallways, stairs, elevators, and others.

Figure 2:
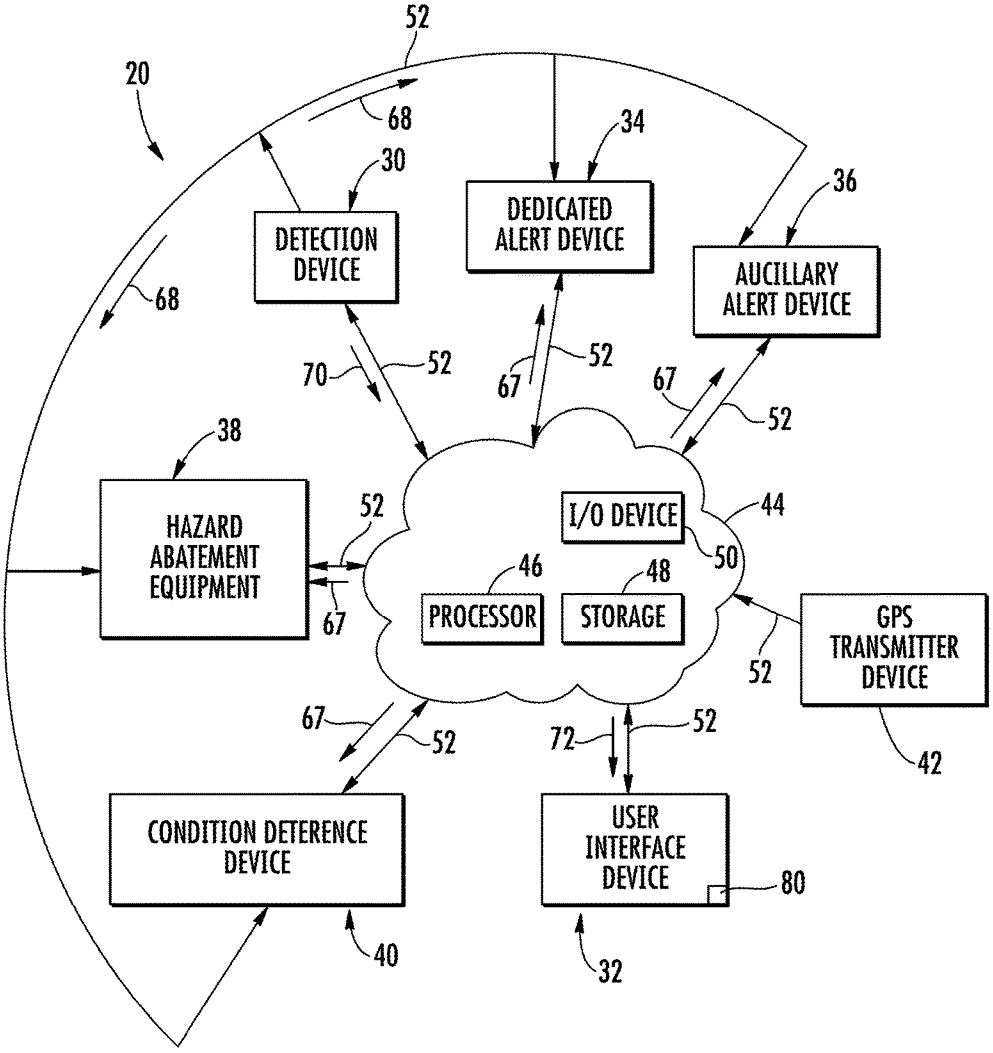
FIG. 2 is a system diagram of the safety automation system.

Referring to FIGS. 1 and 2, the safety automation system 20 may include an assortment of hardware including: detection and/or monitoring devices 30; user interface devices 32; primary or dedicated alert devices 34; ancillary alert devices 36; hazard abatement equipment or devices 38; condition deterence devices 40; a satellite navigation transmitter device 42 and a computing management system 44 that may include a computer processor 46, a computer readable storage medium 48 and an I/O device 50.

The detection devices 30 may generally be located in or on the occupiable structure 22 and may be constructed to detect hazards including smoke, fire, toxic gases, explosive gases temperature extremes, rate of temperature change, intrusion, and others. Non-limiting examples of a detection device 30 may include smoke detectors (e.g., light-based, ionizing, pyroelectric, infrared, and image-sensor or camera based), detectors carbon monoxide, methane, propane, and formaldehydes, and flame detectors, and other types.

The user interface device 32 may be locally or remotely located and may generally alert the user of a detected hazard while providing additionally information with regard to the structure 22, structure occupant(s), system maintenance, and other information. Additionally the user interface device may include interactive prompts that may be selected by the user (e.g., use of a mouse and curser, touching the prompt on a touch screen environment, by issuing a voice command in a voice control I/O environment, etc.) to issue a command. Non-limiting examples of a user interface device 32 may include a computer monitor or screen (e.g., tablet, desktop and laptop), a cellular telephone, a media player (or other handheld or portable electronic device), a wrist-watch device, a pendant device, a headphone or ear-piece device, a router, an embedded system with electronic equipment and a display mounted in a kiosk or automobile, equipment that implements the functionality of two or more of these devices, and others.

The dedicated alert devices 34 may generally be located in or at the occupiable structure 22 and may further be integrated into any one or more of the variety of detection devices 30. Dedicated alert devices 34 are devices that have the specific function of alerting occupants and others when a hazard condition is detected by the detection device 30. Such alerts may include visual, audio, tactile and other alerts. Non-limiting examples of dedicated alert devices 34 may include strobe lights strategically located in the structure 22, verbal alerts over a dedicated intercom, and others. The dedicated alert device 34 may provide appropriate alerts for any one of a plurality of hazard conditions including smoke, fire, tornadoes, earthquakes, hurricanes, carbon monoxide, methane, propane, refrigerant leaks, and others. It is further contemplated and understood that for external hazard conditions such as tornadoes, earthquakes and hurricanes, the dedicated alert devices 34 may be triggered by an external alert from, for example, a weather service.

In contrast to the dedicated alert devices 34, the ancillary alert devices 36 may be those devices that serve an everyday, normal, function, but are also capable of providing an alert function for a safety hazard condition. Moreover, ancillary alert devices 36 may be devices intended to provide alerts of one condition type (e.g., security) and at least some portion thereof may serve to provide an alert of a different hazard condition (e.g., fire). Non-limiting examples of ancillary alert devices 36 may include: a vibrating and/or temperature-cooled bed or other furniture; audio alarms on home appliances that would normally signify completion of a process cycle such as that found in ovens, clothes washing and drying machines; alarm clocks; television speakers, home theater speakers, and others. Particular appliances that provide motion, temperature and/or visual alerts are beneficial for the hearing impaired, and alerts that provide motion, temperature and/or audio alerts are beneficial for the sight impaired.

The hazard abatement device 38, is equipment that is initiated to subdue or alleviate a hazard condition. Such equipment 38 may be controlled via the computing management system 44 and/or may be self-initiated. Non-limiting examples of hazard abatement device 38 may include fire suppression equipment such as sprinkler systems, chemical fire suppressor dispensing systems, high output steam humidifiers, window release and/or opening devices (i.e., in case of carbon monoxide or other gas detection), and others.

The condition deterrence devices 40, may not directly abate a hazard condition, but: may reduce risk of further hazards as a result of the detected hazard conditions; assist in occupant evacuation; assist emergency personnel called to the hazard; and/or, assist in occupant comfort, health and/or safety. Each condition deterrence device 40 may generally be associated with, or may be part of, an appliance 51. Non-limiting examples of an appliance 51 may include: an air handling system that may be part of a forced air heating and cooling system, an air filtration system, a door lock, a humidity control system, an electrical load center, a home entertainment system, and others. Non-limiting examples of condition deterrence devices 40 may include control systems for gas valves, lighting, window locks and others.

The satellite navigation transmitter device 42 may be mobile and is configured to transmit a location signal over pathway 52 to the computing management system 44. The computing management system 44 may generally be part of a cloud computing network that allows application software to be operated using internet-enabled devices. Alternatively, (or in addition to cloud computing), the computing management system 44 may generally be integrated into one or more of the devices 30, 32, 34, 36, 38, 40. The processor 46 of the computing management system 44 may further be programmed to self-monitor and take some form of action to facilitate system maintenance and/or system updating operations.

The devices 30, 32, 34, 36, 38, 40, 42 and/or computing management system 44 may be powered via direct (e.g., batteries) or alternating current, and may be inter-linked by a communications network having communication pathways 52 to establish a network of a plurality of devices 30, 32, 34, 36, 38, 40, 42 and computing management system 44. The communication pathways 52 may include wired and/or wireless pathways. Non-limiting examples of wired pathways 52 may include pathways that pass through the internet, local area network equipment, and other networks.

Non-limiting examples of wireless pathways may include cellular telephone network pathways, local area network pathways, and others.

Figure 3:
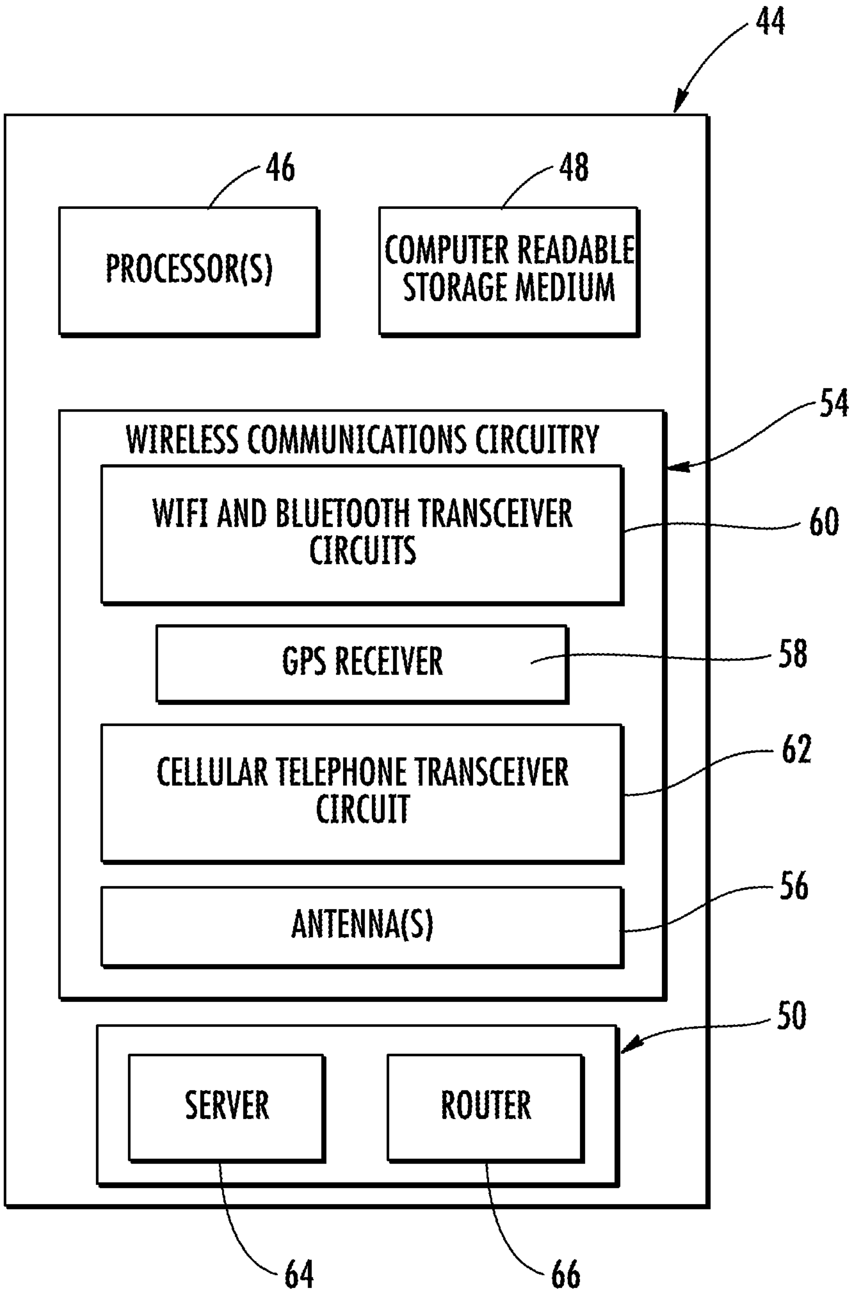
FIG. 3 is a schematic of a computing management system of the safety automation system.
Figure 4:
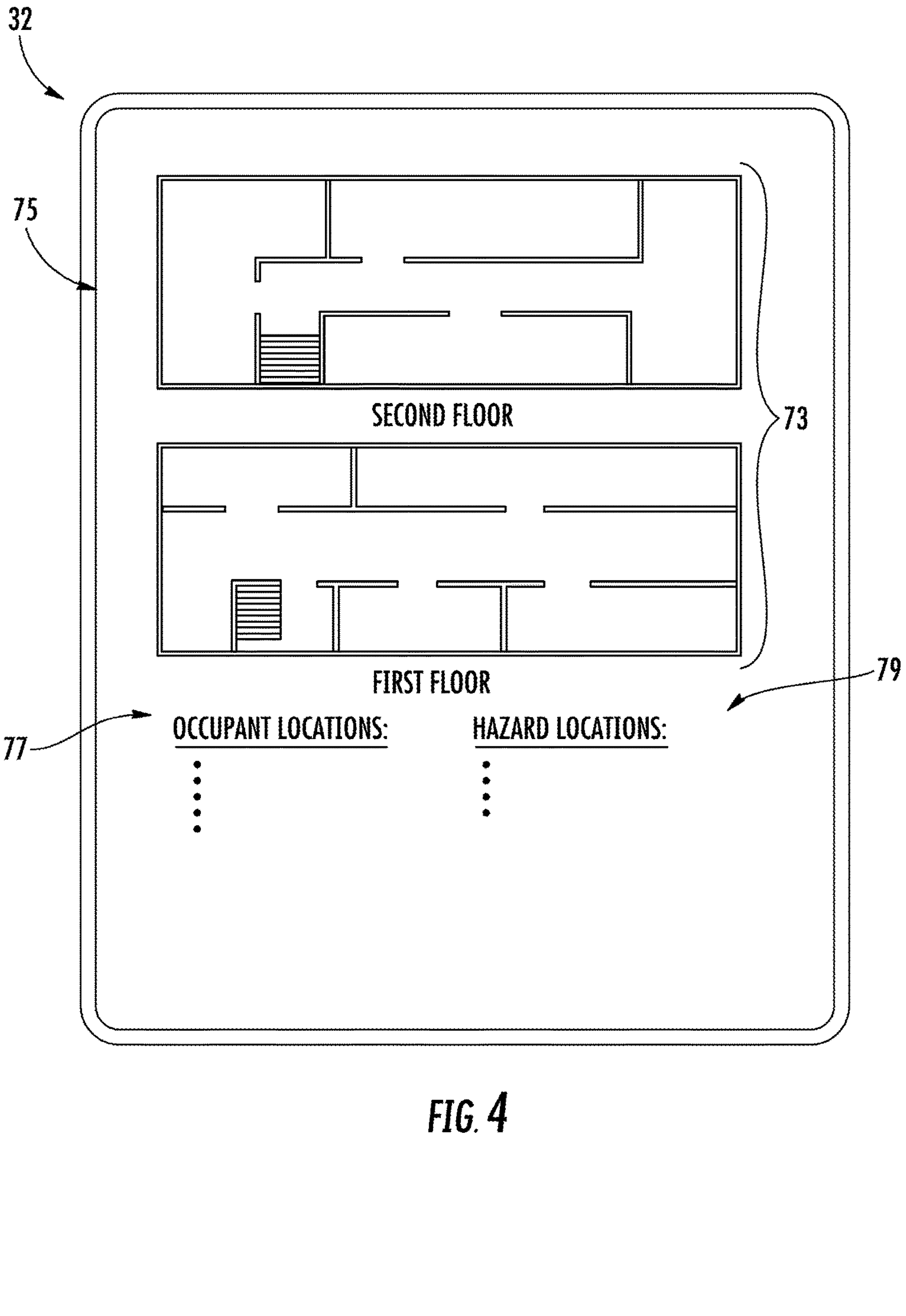
FIG. 4 is a view of an interactive screen of a user interface device of the safety automation system.

Referring to FIG. 3, the computing management system 44 of the system 20 may include control circuitry such as the processor 46 and the computer readable storage medium 48. The storage medium 48 may include hard disk drive storage, nonvolatile memory (e.g., flash memory or other electrically-programmable-read-only memory configured to form a solid state drive), volatile memory (e.g., static or dynamic random-access-memory), and others. The processor 46 and storage medium 48 may be used to control and/or receive signals from any one or more of the devices 30, 32, 34, 36, 38, 40, 42. The processor 46 may be based on one or more microprocessors, microcontrollers, digital signal processors, baseband processors, power management units, audio codec chips, application specific integrated circuits, and others.

The processor 46 may be used to run embedded and cloud server software such as internet browsing applications, voice-over-internet-protocol (VOIP) telephone call applications, email applications, media playback applications, operating system functions, and others. To support interactions with external equipment, the processor 46 may be used in implementing communications protocols. Such communication protocols may include internet protocols, and wireless local area network protocols (e.g. WiFi®), protocols for other short-range wireless communications links such as the Bluetooth® protocol, cellular telephone protocols, and others.

The computing management system 44 may further include wireless communications circuitry 54 that may include radio-frequency (RF) transceiver circuit, power amplifier circuit, low-noise input amplifiers, passive RF components, at least one antenna 56, and other components for receiving and broadcasting RF wireless signals over pathways 52. Circuitry 54 may further include a satellite navigation system receiver circuit 58, a wireless local area network transceiver circuit 60, cellular telephone transceiver circuit 62, and others. The satellite navigation system receiver circuit 58 receives location signals from the satellite navigation transmitter device 42, and may be a Global Positioning System (GPS) receiver circuit, or circuitry associated with other satellite navigation systems. The wireless local area network transceiver circuit 60 may handle pre-specified frequency bands for WiFi® and/or Bluetooth® protocols. Although not illustrated, the wireless communication circuitry 54 may also include wireless circuits for receiving signals from radios, televisions, pagers, and others.

The I/O device 50 of the computing management system 44 facilitates the input and output of signals from and to any number of the devices 30, 32, 34, 36, 38, 40, 42. I/O device 50 may therefore include a server 64 and a router 66 having a plurality of ports with each port associated with a respective device 30, 32, 34, 36, 38, 40, 42. Alternatively, the ports may be dynamically allocated ports.

Referring to FIGS. 1 through 4, any number of devices 30, 32, 34, 36, 38, 40, 42 may be located in and/or outside of the occupiable structure 22. The detection device 30 may be configured to send initiation signals (see arrows 68 in FIG. 2) over pathways 52 directly to any one or more of the dedicated alert devices 34, ancillary alert devices 36, hazard abatement devices 38 and condition deterrence devices 40. Any combination of devices 30, 32, 34, 36, 38, 40, 42 may be integrated together in, for example, a common housing. As one example, the detection device 30 may be a smoke detector and the dedicated alert device may be an audible alert housed in the smoke detector. As another example, the user interface device 32 may be a mobile cellular telephone or an interactive display mounted in an automobile, and the satellite navigation transmitter device 42 may be physically integrated into the cellular telephone or the automobile, respectively.

In operation, the safety automation system 20 may provide notification of a hazard condition associated with safety and property damage risks while the occupant or other individual is outside of the occupiable structure 22. For example, the detection device 30 may detect a hazard condition and outputs a hazard detected signal (see arrow 70 in FIG. 2) over pathway 52 to the computing management system 44. In accordance with pre-programmed instructions, the processor 46 via the I/O device 50 may send a notification signal (see arrow 72) over pathway 52 to the cellular telephone 32 carried by the occupant while outside of the occupiable structure 22. Upon receipt of a hazard detected signal 70, the computing management system 44 may process and send a command signal (see arrow 67) to any one or more of the hazard abatement devices 38, the condition deterrence devices 40, the dedicated alert devices 34, and the ancillary alert devices 36 over pathways 52.

The management system 44 may further provide an assortment of pre-programmed information (i.e., computer readable data) to the user or occupant based on the hazard condition detected. For example, if a fire 74 is detected, contact information of the nearest fire department may be provided. If an intruder is detected, contact information of the nearest police department may be provided. Yet further, the management system 44 may contact the user via the user interface device 32 with other information not initiated by a hazard detection/condition. For example, other information may include maintenance scheduling, results of a self-check of the system 20, device troubleshooting, location of a disabled device, and others. For example, the batteries in smoke detectors 30 may be scheduled for replacement as pre-programed into the system 44 or as a result of a system self-check. The management system 44 may notify the user of this need via the user interface device 32 at any time. Alternatively, or in addition thereto, when the user interface device 32 and the GPS transmitter device 42 is in an automobile, the management system 44 may continuously track the location of the user, and may notify or remind the user that replacement batteries are required and that a maintenance part retail store is on-route or nearby.

The safety automation system 20 may further provide notification about the location 79 (see FIG. 4) of the hazard condition within the occupiable structure 22, the hazard propagation path, and the location 77 of any occupants in the occupiable structure 22. For example, the hazard condition may be an intrusion and the detection device 30 may be a plurality of motion sensors located strategically throughout the structure 22. As each sensor detects motion and sequentially sends a hazard detected signal 70 to the computing management system 44 over pathways 52, the processor 46 along with the computer readable storage medium 48 may track the progression of the intruder and associate the intruder location 79 and resulting progression with a map 73 (i.e., image, see FIG. 4) of the structure 22 pre-programed into the management system 44 and displayed on an interactive screen 75 of the user interface device 32. A plurality of notification signals 72, which generally track this progression in real time, may be sent to the user interface device 32 carried by the occupant (e.g., cellular telephone) and/or possessed by other individuals such as a police force (e.g., interactive screen 75 in a patrol automobile). In addition, expected or designated occupant locations 77 (see FIG. 4) in the structure 22 may be pre-programmed into the management system 44 and displayed adjacent to or as part of the structure map 73 displayed on the screen 75 of the user interface device 32.

Another, non-limiting, example may include mapping of fire propagation. That is, the smoke levels detected by multiple smoke detector devices 30 and associated alarm or alert devices 34, and/or the carbon monoxide levels measured by multiple detectors and/or alarms throughout the occupiable structure 22 may be used to determine where a fire initiated and where the fire is propagating, as well as the number of occupants and their locations. This information may be made available to first responders for the creation of a fire fighting strategy.

The safety automation system 20 may further provide 'customized' notification about safety hazard conditions, severe weather hazard conditions (i.e, weather report) and/or property damage risk hazard conditions while an occupant may be inside the occupiable structure 22. Such notification may be facilitated by leveraging the dedicated alert devices 34 and/or ancillary alert devices 36 that may be, as non-limiting examples, acoustic, visual and/or tactile devices in communication with the management system 44. More specific examples of devices 34, 36 may include bed shakers, strobes, security sirens, speakers, mobile devices, televisions, room lights, and others. The management system 44 may enable a degree of customized operation of devices 34, 36 relevant to the frequency of notifications and/or reminders on any given hazard condition occurrence, the types of sound, the color of light, and others.

As one, non-limiting, example, a fire 74 may occur in room 26 on the first floor 24 of the occupiable structure 22. A hearing-impaired occupant may be sleeping in a bed 76 in room 26 on the second floor 24. A dedicated alert device 34 may be a shaker mechanism constructed to shake or vibrate the mattress of the bed 76, thus providing an alert to wake a sleeping occupant who may be hearing impaired. Alternatively, the shaker mechanism may be an ancillary alert device 36 providing a dual function that includes the ability to provide a soothing massage upon demand by the occupant, and the alert function described herein. Similarly, the bed 76 may include a temperature mechanism as an ancillary alert device 36 that generally keeps the bed at a comforting controlled temperature, and may provide a more drastic temperature reduction to alert the occupant of a hazard condition.

In operation (i.e., bed shaker), a smoke detector 30 in room 26 on the first floor 24 may detect smoke from the fire 74. The smoke detector 30 may output an initiation signal 68 directly to the ancillary alert device 36 in the bed shaker 76 and/or output a hazard detected signal 70 to the computing management system 44 via the pathways 52, and I/O device of the system 44. The processor 46 may then initiate, and the I/O device 50 outputs a command signal (see arrow 78 in FIG. 2) to the ancillary alert device 36 to initiate shaking of the bed 76.

Alternatively, or in addition to, the shaking of the bed 76, a dedicated alert device 34 may be a flashing strobe configured to alert a hearing-impaired occupant. Alternatively, the flashing strobe may be an ancillary alert device 36 having a primary function as a security strobe with the secondary function to provide a visual smoke alert. The management system 44 may further provide a degree of customization concerning the various hazard alerts. For example, the amplitude and/or frequency of the shaking bed 76 may be pre-programmed into the management system 44 via, for example, the user interface device 32. Similarly, the flashing frequency and the color of the flashing strobe may be adjustable and pre-programmed into the management system 44.

The safety automation system 20 may further provide effective reporting to first responders and emergency personnel, thus facilitating fast arrival to the occupiable structure 22, accurate location of the structure 22, safe access to and within the structure, navigation inside the structure, location 77 of occupants, location of portable fire extinguishers, and communication with the occupants. As one, non-limiting, example, the first responders may be a local, municipal fire department that possesses a mobile user interface device 32 that may be mounted directly into, for example, a fire truck. A GPS transmitter device 42 may be integrated into the user interface device 32 and the location of the occupiable structure 22 may be pre-programmed into the management system 44. A display of driving directions to the structure 22 may then be provided on the screen 75 of the user interface device 32. The same interface device 32, or a mobile interface device 32 carried by a fireman, may also provide pre-programmed occupant locations 77 with the map 73 of the structure 22. In real time, the management system 44 may receive multiple hazard detected signals 70 from a plurality of strategically placed detection devices 30. Each detection may be outputted by the management system 44 as a notification signal 72 and displayed on the map 73, thereby providing location 79 and propagation information of the fire 74.

Yet further, with the occupant mapping locations 77 described above, the firemen may utilize, for example, a microphone 80 (see FIG. 2) built into the user interface device 32 to communicate with occupants in the structure 22. Communications may be processed via the management system 44 utilizing existing audio-based alert devices 34, 36.

Although in the example provided above, the fire department possesses a user interface device 32, it is further contemplated and understood that the management system 44 may contact any number of various municipal departments and/or individuals (e.g., neighbors and close social media contacts) via more conventional means such telephones, email addresses and other means pre-programmed into the management systems 44.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A safety automation system for an occupiable structure comprising:

a computing management system including a computer processor, and a computer readable storage medium;

a detection device adapted to detect a hazard condition and output an associated signal to the computing management system, and wherein the computing management system is configured to send a hazard notification signal to a user interface device remotely located from the occupiable structure; and a satellite navigation transmitter device in wireless communication with a satellite navigation receiver of the wireless communication circuitry, wherein the satellite navigation transmitter device outputs a navigation signal to the computing management system indicative of a location of the mobile user interface device, wherein the computing management system is configured to send a notification signal to the mobile user interface device when the safety automation system is in need of maintenance and when the mobile user interface device is near a store that supplies at least one of maintenance parts and services.

* * * * *